A. W. WELLS.
OPHTHALMIC MOUNTING.
APPLICATION FILED JUNE 3, 1914.
1,152,249.
Patented Aug. 31, 1915.
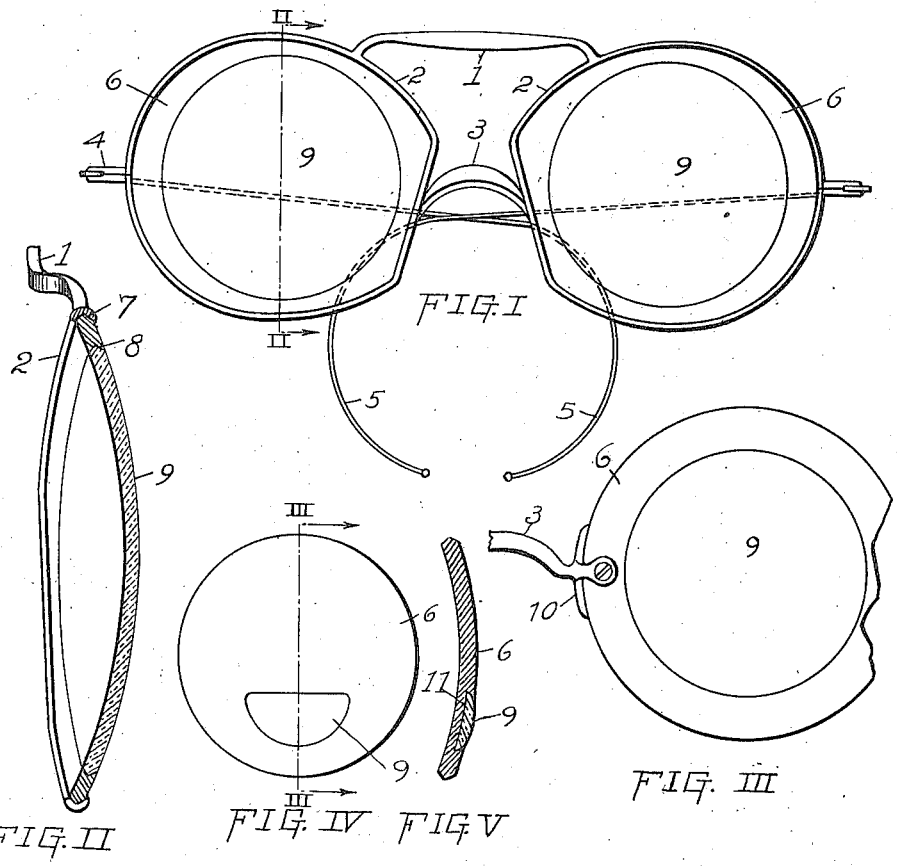
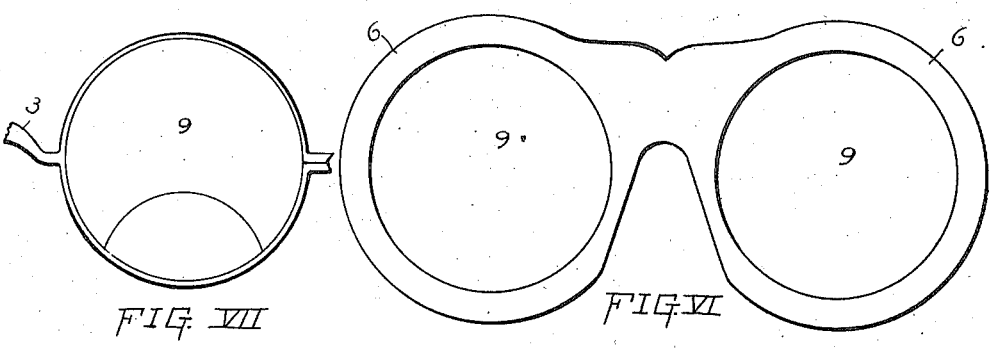
WITNESSES:
INVENTOR
ALBERT W. WELLS
BY
ATTORNEYS

UNITED STATES PATENT OFFICE.

ALBERT W. WELLS, OF SOUTHBRIDGE, MASSACHUSETTS.

OPHTHALMIC MOUNTING.

1,152,249.   Specification of Letters Patent.   Patented Aug. 31, 1915.

Application filed June 3, 1914. Serial No. 842,569.

*To all whom it may concern:*

Be it known that I, ALBERT W. WELLS, a citizen of the United States, residing at Southbridge, in the county of Worcester and State of Massachusetts, have invented certain new and useful Improvements in Ophthalmic Mountings, of which the following is a specification.

My invention relates to improvements in ophthalmic mountings and has particular reference to an improved type of lens and mounting therefor.

The leading object of my invention is the provision of an improved manner of mounting a lens which will permit of ready adaptation of an ordinary form of lens to a wide variety of mountings.

A further object of my invention is the provision of an improved combination lens in which breakage of the lens will be reduced to a minimum, in which the lens will be protected to a great degree, and in which the expense of the same to the wearer will be greatly reduced.

Another object of my invention is the provision of a lens particularly adapted for use in goggles, which may be made of bifocal form at but slight expense.

Other objects and advantages of my improvement should be readily apparent by reference to the following description taken in connection with the accompanying drawings, and it will be understood that I may make any modifications in the specific details of construction shown and described within the scope of the appended claims without departing from or exceeding the spirit of my invention.

Figure I represents a front elevation of one form of mounting constructed in accordance with and embodying my invention. Fig. II represents a vertical sectional view on the line II—II of Fig. I. Fig. III represents a fragmentary front elevation illustrating a modified form of my construction. Fig. IV represents a view of a lens embodying a still further modification thereof. Fig. V represents a sectional view on the line V—V of Fig. IV. Fig. VI represents a front view of a modified form of my construction, and Fig. VII represents a view of a different style of bifocal lens.

In the drawings, in which similar characters of reference are employed to denote corresponding parts throughout the several views, the numeral 1 designates the cross piece connecting the eye wires 2 of a goggle, said eye wires being further connected by a bridge member 3 and having at their outer ends the end pieces 4 for the temples 5.

The above is one of the ordinary constructions of goggles hitherto known. It is to be noted in connection with this style that it has hitherto been necessary in fitting the same with lenses to prepare an extra large lens blank, specially shape, grind and form the same for use in conjunction with this mounting, and then to specially edge the same to correctly fit the eye wire, all of these operations involving considerable expense so as to in fact place this type of goggle in the class of luxuries rather than necessities. On the other hand, this form of goggle is extremely desirable for all those requiring either protection glasses or goggles on account of the fact that the large lens can be shaped to fit around the face giving a maximum range of vision and protection with a minimum of weight and at the same time presenting a neat and attractive appearance as will be best understood by reference to Fig. I.

My improved lens, as illustrated in Figs. I and II, comprises an outer portion 6 formed from suitable material or composition such as celluloid or the like, preferably being made from selected stock which is clear and transparent to permit of ready vision therethrough, being either white or colored as may be desired. This portion 6 being of relatively soft material may be readily cut and shaped or may simply be died out to the correct form without the necessity of any special work, and consequently may be fitted within special shapes of eye wire with comparatively small labor and at relatively small cost as compared with that of fitting a glass lens thereto. I have shown the same as beveled at 7 to readily fit the eye wire, and as being formed with a central beveled aperture 8 to receive a lens. The lens 9 shown in the figures is of the side of a regular ophthalmic lens blank and consequently may be readily ground to prescription if desired by an optician from his regular stock without the necessity of securing a special blank, and may be then suitably secured within the member 6. I have illustrated the lens 9 as simply snapped into position within the beveled aperture 8, this being possible by those familiar with the use of the material 6, although if preferred cement or similar inconspicuous fastening medium may be employed. I prefer, however, to simply snap the lens into place as illustrated in Fig. II, as this makes the neatest and least conspicuous appearance or lines when looking through the mounting.

In Fig. III, I have illustrated my device as employed with a frameless mounting, the lens attachment 10 being secured to the portion 6 thus eliminating the necessity for drilling of the lens an always risky operation and one liable to entail breakage of the same. This consequently facilitates the securing of the lens to a rimless mounting.

In Figs. IV and V, I have illustrated another modification of my invention in which I employ a small lens segment 9, which in place of fitting within its aperture 8 fits into a recess 11 in the member 6, the member 6 thus extending to hide the lens and reënforcing the same to prevent any possibility of breaking and flying of the same against the face of the wearer, reducing to a minimum the liability of breakage of the lens when the mounting is dropped and in the form shown placing the lens in correct position for reading as for reference to a road map or guide, while allowing of clear vision without a prescription lens before the eye when looking forward over the road.

In Fig. VI, I have illustrated a form of my invention in which the two members 6 and the bridge or connecting portion are all stamped from a single piece of material having merely the apertures to receive the lenses 9.

Fig. VII illustrates a still further modification of my invention in which in place of a central aperture to receive the lens 9 I have formed a recess in the lower edge of the lens into which the glass segment may be inserted, the surrounding frame serving to secure the parts together.

From the foregoing description taken in connection with the accompanying drawings the construction of my improved device should be readily apparent, and it will be seen that I have provided an extremely simple and efficient structure embodying a preferably clear and transparent celluloid or other composition outer member serving as a filler or intermediate portion between the frame of the mounting and the lens proper which member may be readily fitted either by stamping or cutting to any style of frame in place of necessitating the special size of blanks and special edging of lenses necessary previous to my invention. It will further be seen that on account of the material employed which is softer and less readily broken than glass that my mounting will withstand many shocks which would break an ordinary glass lens, the portion 6 thus serving as a cushion between the frame and the lens or around the lens and reducing to a minimum breakage of the lens on account of jar thereagainst or dropping thereof. In addition my device enables one to use an ordinary size of lens permitting of ready replacement of the lens by any dealer when the same is broken in place of making it necessary to order a special lens made up as has hitherto been necessary, and it will consequently from the foregoing be observed that I have provided an extremely desirable and efficient construction which will commend itself to all on account of its practicability and desirability.

I claim:

1. An ophthalmic lens comprising a central glazed portion and a surrounding transparent relatively infrangible portion.

2. An ophthalmic lens comprising an exterior transparent composition member, means attached to said member for securing the mounting to the face, said member having a grooved recess formed centrally therein and a lens mounted in the recess and secured in position by engagement between the outer edge of the lens and the inner edge of the recess, substantially as described.

3. A device of the character described, including a frame, a transparent composition member mounted within and fitting the frame, said member having a recess formed therein, the exterior edge of the member being tapered or beveled to fit the frame and the edge of the recess being inwardly beveled, and a lens fitted within the recess and having an outwardly beveled edge tightly engaging the inner face of the recess for securing the lens in position, the thickness of the lens and the member surrounding the same being substantially equivalent, whereby a relatively inconspicuous joint is secured.

4. An ophthalmic mounting comprising a frame portion, a lens of considerably less size than the frame portion, and a transparent filler interposed between the lens and the frame member and making a flush joint with both the lens and the said frame member.

5. A device of the character described, comprising a transparent composition protection member having a recess formed in one face thereof and extending but partially therethrough, and a lens embedded in the recess, whereby the composition member serves as a mounting and a reinforcement for the lens to secure the same in position and prevent flying of the lens if broken.

In testimony whereof I affix my signature in presence of two witnesses.

ALBERT W. WELLS.

Witnesses:
ROCKWOOD S. EDUARDS,
WALTER G. BUCKLEY.